US011526811B1

(12) United States Patent
Wu et al.

(10) Patent No.: US 11,526,811 B1
(45) Date of Patent: Dec. 13, 2022

(54) METHOD FOR PREDICTING TRIP PURPOSES USING UNSUPERVISED MACHINE LEARNING TECHNIQUES

(71) Applicant: INTUIT INC., Mountain View, CA (US)

(72) Inventors: Grace Wu, Mountain View, CA (US); Shashank Shashikant Rao, Mountain View, CA (US); Susrutha Gongalla, Mountain View, CA (US); Ngoc Nhung Ho, Mountain View, CA (US)

(73) Assignee: INTUIT, INC., Mountain View, CA (US)

(*) Notice: Subject to any disclaimer, the term of this patent is extended or adjusted under 35 U.S.C. 154(b) by 790 days.

(21) Appl. No.: 16/510,225

(22) Filed: Jul. 12, 2019

Related U.S. Application Data

(60) Provisional application No. 62/697,309, filed on Jul. 12, 2018.

(51) Int. Cl.
| | |
|---|---|
| *G06N 20/00* | (2019.01) |
| *G06N 20/20* | (2019.01) |
| *H04W 4/029* | (2018.01) |
| *G06V 30/262* | (2022.01) |
| *G06F 40/289* | (2020.01) |

(52) U.S. Cl.
CPC ........... *G06N 20/20* (2019.01); *G06V 30/268* (2022.01); *H04W 4/029* (2018.02); *G06F 40/289* (2020.01)

(58) Field of Classification Search
CPC ..... G06N 20/20; H04W 4/029; G06V 30/268; G06F 40/289
See application file for complete search history.

(56) References Cited

U.S. PATENT DOCUMENTS

| | | | | |
|---|---|---|---|---|
| 8,954,425 | B2* | 2/2015 | Xiao | G06F 16/29 707/727 |
| 2011/0302124 | A1* | 12/2011 | Cai | G06F 16/353 707/723 |
| 2015/0032366 | A1* | 1/2015 | Man | H04W 4/024 701/414 |
| 2017/0337261 | A1* | 11/2017 | Wang | G06F 16/3329 |
| 2019/0121808 | A1* | 4/2019 | Chadha | G06F 16/2365 |

* cited by examiner

*Primary Examiner* — Pakee Fang
(74) *Attorney, Agent, or Firm* — Patterson & Sheridan, LLP

(57) ABSTRACT

Certain aspects of the present disclosure provide techniques for recommending trip purposes to users of an application. Embodiments include receiving labeled travel data from the application running on a remote device including a plurality of trip purposes. Embodiments include building a topic model representing words associated with a plurality of topics. Embodiments include training a topic prediction model, using the plurality of topics and one or more features derived from each of the plurality of trip records, to output a topic based on an input trip record. Embodiments include training a purpose prediction model, using the topic model and the plurality of trip purposes, to output a trip purpose based on an input topic. The trip purpose may be recommended to a user via a user interface of the application running on the remote device.

18 Claims, 7 Drawing Sheets

| TOPIC | WORDS |
|---|---|
| 0 | shoot travel photo wedding rehearsal trip location event session video client |
| 1 | supplies pick office drop work delivery picking business trip materials pickup |
| 2 | office work client job travel visit drive trip customer back driving commute |
| 3 | showings project lesson walk support tutoring inc onsite consulting case hours |
| 4 | business trip travel client office training sales meet event networking meetings |
| 5 | uber lyft driving delivery work route rideshare ride trip pick mileage drop |

FIG. 3

METHOD FOR PREDICTING TRIP PURPOSES USING UNSUPERVISED MACHINE LEARNING TECHNIQUES

RELATED APPLICATIONS

This application claims the benefit of U.S. Provisional Application No. 62/697,309, entitled "METHOD FOR PREDICTING TRIP PURPOSES," by the same inventors, filed 12 Jul. 2018, the contents of which are incorporated herein in their entirety.

INTRODUCTION

Aspects of the present disclosure relate to predicting trip purposes based on electronic trip records.

A common business task is accounting for expenses, such as those related to travel. For example, an individual may use their car for business purposes and subsequently assess that use (including, for example, maintenance, gas, and wear and tear) as an expense against any business income attributable to the use (i.e., "write it off"). In some tax systems, the individual may have to track, collect, and report such business expenses on a regular basis, such as in quarterly or yearly tax filings.

In some tax systems, individuals are given two options for deducting business use vehicle expenses from their related business income. First, the individual may track actual vehicle-related costs (e.g., with gas and maintenance receipts, etc.) and deduct such costs. Second, an individual may track the number of miles driven for business purposes and apply a standard formula (e.g., 54 cents for every mile driven) that converts that mileage into a total deductible expense. For the latter, most individuals use odometer readings to track mileage.

Whereas tracking trip mileage used to be a tedious, manual task, often done by hand, now software applications exist that allow users to actively track mileage and record trips automatically. For example, an individual may have a mobile device with a mobile application that leverages a GPS capability of the mobile device on which the application is running to track mileage automatically. While such a feature is undoubtedly more convenient than the conventional pen-and-paper approach, users of such software applications must still go through the time-consuming and error-prone task of reviewing each recorded trip and manually labeling it as either business related or personal (because personal trips may not be tax deductible).

Furthermore, tax laws and regulations in certain jurisdictions require labeling each business trip with a trip purpose. For example, tax forms that are used by self-employed individuals to report business deductions may require each deduction (e.g., trip) to be associated with a proper business purpose. For example, a trip related to a user's job as a realtor may have a trip purpose such as "showing a home" or "visiting a client," and the trip purpose may vary between trips. Manually labelling each trip as business or personal, and then having to further label each business trip with an appropriate trip purpose, is a time-consuming and inconvenient process, as it requires users to keep track of the purposes of all business-related trips and enter each purpose by hand.

Compounding the problem of manually labeling trips with trip purposes is that many jobs may require significant numbers of trips, which in-turn require significant amounts of manual labeling. For example, individuals driving personal vehicles for ride-sharing services, delivery services, and other similar vehicle-based services may have hundreds or even thousands of trips in a month to sort through and label. The size and character of the manual labeling task makes it one that promotes mistakes, if it is done at all. In fact, many individuals simply forgo the task either not realizing or simply accepting the fact that they are losing significant tax savings as a consequence.

Accordingly, what is needed is a way to intelligently predict trip purposes.

BRIEF SUMMARY

Certain embodiments provide a method for recommending trip purposes to users of an application. The method generally includes receiving labeled travel data from the application running on a remote device, wherein the labeled travel data comprises a plurality of trip purposes, wherein each trip purpose of the plurality of trip purposes corresponds to a trip record of a plurality of trip records; pre-processing the plurality of trip purposes by: consolidating sentences in the plurality of trip purposes based on similarities between strings; and separating each trip purpose of the plurality of trip purposes into a set of words; building a topic model representing words associated with a plurality of topics based on statistical analysis of the plurality of trip purposes, wherein at least one topic of the plurality of topics is assigned to each of the plurality of trip purposes; deriving one or more features from each of the plurality of trip records; training a topic prediction model of an ensemble classifier, using the plurality of topics and the one or more features derived from each of the plurality of trip records, to output a topic based on an input trip record; and training a purpose prediction model of the ensemble classifier, using the topic model and the plurality of trip purposes, to output a trip purpose based on an input topic, wherein the purpose prediction model uses one or more words associated in the topic model with the input topic in determining the trip purpose, wherein the trip purpose comprises the one or more words; and wherein the trip purpose output by the purpose prediction model is recommended to a user via a user interface of the application running on the remote device.

Other embodiments provide a non-transitory computer-readable medium comprising instructions that, when executed by one or more processors, cause the one or more processors to perform a method for recommending trip purposes to users of an application. The method generally includes receiving labeled travel data from the application running on a remote device, wherein the labeled travel data comprises a plurality of trip purposes, wherein each trip purpose of the plurality of trip purposes corresponds to a trip record of a plurality of trip records; pre-processing the plurality of trip purposes by: consolidating sentences in the plurality of trip purposes based on similarities between strings; and separating each trip purpose of the plurality of trip purposes into a set of words; building a topic model representing words associated with a plurality of topics based on statistical analysis of the plurality of trip purposes, wherein at least one topic of the plurality of topics is assigned to each of the plurality of trip purposes; deriving one or more features from each of the plurality of trip records; training a topic prediction model of an ensemble classifier, using the plurality of topics and the one or more features derived from each of the plurality of trip records, to output a topic based on an input trip record; and training a purpose prediction model of the ensemble classifier, using the topic model and the plurality of trip purposes, to output a trip purpose based on an input topic, wherein the purpose prediction model uses one or more words associated in the topic model with the input topic in determining the trip purpose, wherein the trip purpose comprises the one or more words; and wherein the trip purpose output by the purpose prediction model is recommended to a user via a user interface of the application running on the remote device.

Other embodiments provide a system comprising one or more processors and a non-transitory computer-readable medium comprising instructions that, when executed by the one or more processors, cause the one or more processors to perform a method for recommending trip purposes to users of an application. The method generally includes receiving labeled travel data from the application running on a remote device, wherein the labeled travel data comprises a plurality of trip purposes, wherein each trip purpose of the plurality of trip purposes corresponds to a trip record of a plurality of trip records; pre-processing the plurality of trip purposes by: consolidating sentences in the plurality of trip purposes based on similarities between strings; and separating each trip purpose of the plurality of trip purposes into a set of words; generating a topic model representing words associated with a plurality of topics based on statistical analysis of the plurality of trip purposes, wherein at least one topic of the plurality of topics is assigned to each of the plurality of trip purposes; deriving one or more features from each of the plurality of trip records; training a topic prediction model of an ensemble classifier, using the plurality of topics and the one or more features derived from each of the plurality of trip records, to output a topic based on an input trip record; and training a purpose prediction model of the ensemble classifier, using the topic model and the plurality of trip purposes, to output a trip purpose based on an input topic, wherein the purpose prediction model uses one or more words associated in the topic model with the input topic in determining the trip purpose, wherein the trip purpose comprises the one or more words; and wherein the trip purpose output by the purpose prediction model is recommended to a user via a user interface of the application running on the remote device.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 depicts examples of a topic model related to recommending trip purposes to users of an application.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
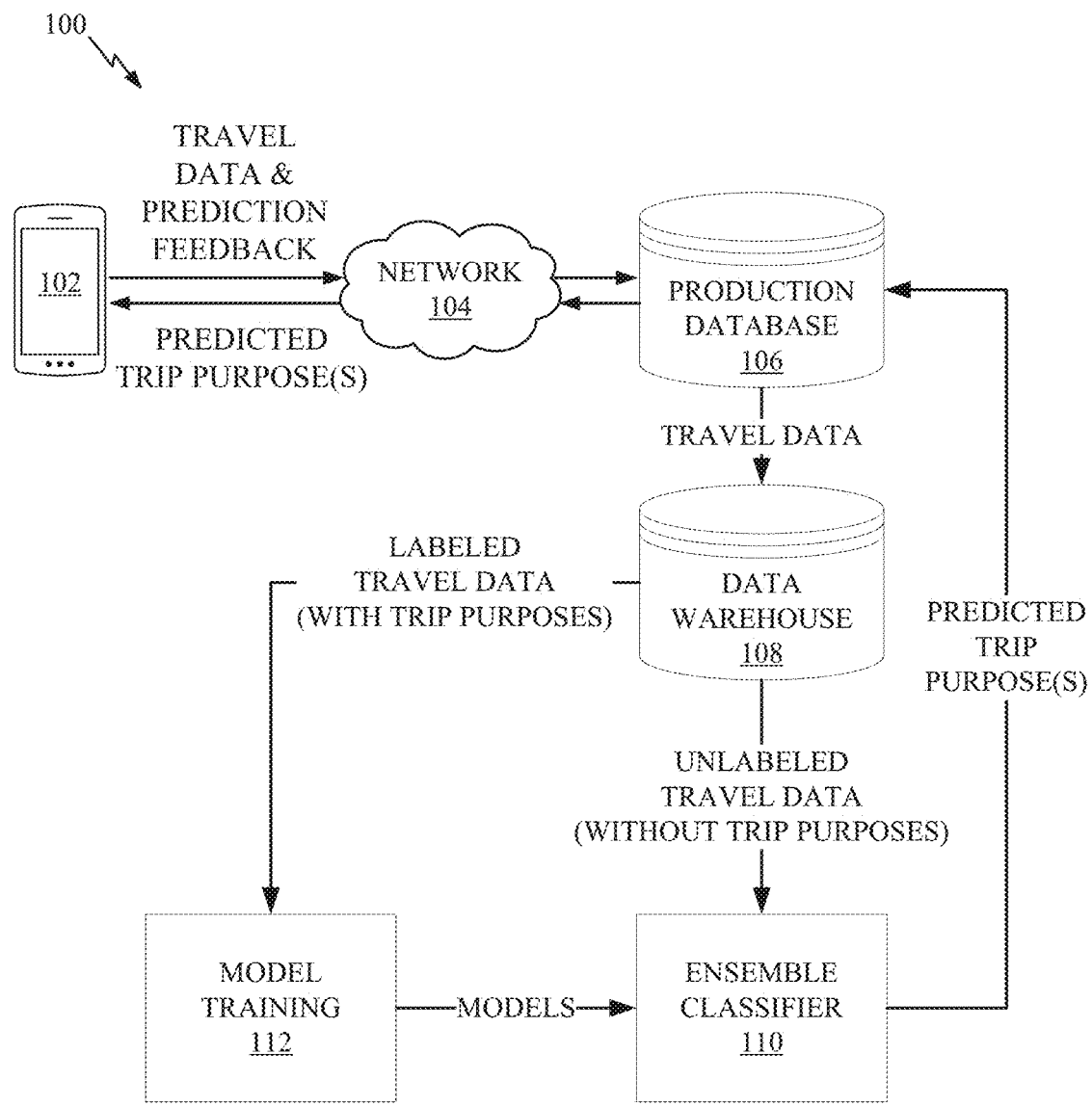
FIG. 1 depicts a system for recommending trip purposes to users of an application.

Aspects of the present disclosure provide apparatuses, methods, processing systems, and computer readable mediums for intelligently recommending trip purposes to users of an application.

Predicting trip purposes based on travel data, such as travel data related to trips taken in a vehicle, and recommending the predicted trip purposes to a user through an application user interface allows for the user to more quickly and efficiently label (e.g., assign trip purposes) to the travel data. For example, through such a user interface, a user may be presented with one or more recommended trip purposes for a single trip or a group of trips, and the user may be enabled to either accept one of the recommended trip purposes or define a different trip purpose. To be most useful, the prediction of trip purposes to recommend may be dynamic and user-centric. This is because simple and static rules for predicting trip purposes based on travel data (e.g., trip records) may not work correctly within diverse populations of users. For example, while a user working in the rideshare industry may take trips between a variety of locations for the same purpose (e.g., driving for rideshare), a user working as a realtor may go to certain locations to pick up marketing materials and may go to other locations to show houses. Therefore, embodiments described herein include user and multi-user prediction models that are trained on user- and multi-user specific data using machine learning techniques. This personalized nature of prediction models also enables dynamic adaptation to user-job switching, for instance, from rideshare to realtor, as the model learns from new trip purposes being assigned to the trips. The prediction models automatically predict topics based on travel data (e.g., trip records) and predict trip purposes based on topics so that one or more recommended trip purposes may be presented to the user in a user interface of an application, such as a personal or business finance application. Further, in some embodiments, user feedback is collected based on the recommended trip purposes, which is fed back to a training function so as to consistently and dynamically refine the prediction models.

Embodiments described herein represent many improvements over conventional methods. For example, automatically predicting trip purposes based on travel data for recommending to a user in a user interface provides for significantly faster and more comprehensive labeling of trips with trip purposes as compared to conventional methods. Further, automatically recommending trip purposes based on travel data increases the accuracy and consistency of labeling (i.e., assigning trip purposes) as compared to conventional methods. Further yet, automatically recommending trip purposes based on travel data for review in a user interface improves the utilization of device resources, such as processing resources and battery life (because the labeling can be completed much more quickly as compared to conventional methods). For a user, the automatic recommendation of trip purposes may improve the consistency with which the labeling is completed and the accuracy of the labeling, which leads to more accurate tax filings and reduced taxes. Further, the intuitiveness and efficiency of the application user interface employing automatic recommendations of trip purposes may lead to higher application usage rates and more committed application users, which in-turn drives the accuracy of the prediction models due to the increase in user data usable for training and validation of the prediction models. The aforementioned are only a few of the improvements of conventional technologies, and other benefits will be apparent to those of skill in the art.

Example System Architecture for Predicting and Recommending Trip Purposes

FIG. 1 depicts a system 100 for recommending trip purposes to users of an application. System 100 includes production database 106, which receives travel data from users. For example, production database 106 may receive travel data in the form of trip records from an application running on user device, such as mobile device 102 over network 104. In some examples, mobile application 102 may be a personal or business finance application that includes an automatic trip or mileage tracking function. In other examples, mobile application 102 may be a dedicated mileage tracking application.

Network 104 may be any sort of data communication network capable of carrying travel data from a user device, such as mobile device 102, to production database 106. For example, network 104 may be a local area network, wide area network, cellular network, ad-hoc network, near-field communication network, the Internet, or any other known or later developed network.

Mobile device 102 may be any form of electronic device capable of running applications and communicating data over a network interface. For example, mobile device 102 may be a smartphone, tablet computer, laptop computer, smart wearable device, autonomous or semi-autonomous vehicle, and other electronic devices capable of determining their location and communicating over a data network, such as network 104.

In some examples, production database 106 may receive travel data from a user device, such as mobile device 102, at regular intervals (e.g., once a day) or continuously (e.g., while the mobile application is running in the foreground or background). Alternatively, production database 106 may include an agent or other function that requests the travel data from remote mobile applications, such as remote mobile applications that may be installed on mobile device 102.

The trip records received by and stored in production database 106 (e.g., from mobile device 102) may include, among other things, location data (e.g., in GPS or other location coordinates), such as starting and finishing locations and route locations. The trip records may also include times, which in some cases may be based on timestamps associated with the location data. Further the trip records may include various types of metadata, such as what type of vehicle the trip was made in, how much time elapsed during the trip, how much gas was used during the trip, and many others.

In some cases, the trip records may include label data (e.g., a trip type such as business or personal and a trip purpose such as "meeting with client") when received by production database 106, such as when a user has already labeled the trip records. In some embodiments, only trips that are labeled as business are labeled with a trip purpose. Some trip records may only include location data or may include location data and other ancillary data (e.g., type of vehicle) that is not necessarily determinative of trip purpose.

Travel data (such as trip records) received by production database 106 may be stored in data warehouse 108. For example, a server hosting production database 106 may be configured for speed and thread capacity (e.g., to handle traffic from many users), whereas data warehouse 108 may be hosted by a server configured for storage capacity and resiliency.

In the depicted example, labeled travel data arriving at data warehouse 108 by way of production database 106 may be sent to model training module 112 for purposes of training prediction model(s) 110. In some examples, an agent of data warehouse 108 may automatically determine that newly received data is labeled with a trip purpose, and may thereafter send the labeled travel data to model training module 112. In other examples, model training module 112 may periodically or continuously send requests to data warehouse 108 for new travel data labeled with trip purposes. In yet other examples, production database 106 may send travel data that is labeled with trip purposes to model training module 112 directly as well as sending the same travel data to data warehouse 108.

Model training module 112 is used to train ensemble classifier 110 based on, for example, labeled travel data (e.g., trip records labeled with a trip purpose). Thus, training module 112 may perform, at least in part, supervised learning techniques to create an ensemble classifier 110, which may comprise a plurality of prediction models. The labeled travel data (also referred to as ground truth travel data) is therefore an input to a machine learning process that creates ensemble classifier 110. It is noted that ensemble classifier 110 is included as one example. And other types of prediction models may be used to predict topics and/or trip purposes based on travel data. In certain embodiments, an ensemble classifier is used because it allows for different techniques to be employed for different aspects of the prediction process. For example, the ensemble classifier may include models trained using unsupervised techniques (e.g., topic modeling) and models trained using supervised techniques (e.g., models for predicting trip purposes based on topic modeling).

A "topic" may represent an abstraction that is determined based on statistical analysis of a plurality of trip purposes, and comprises a set of words that are determined to be associated with one another. The words in each topic model represent the words that that have the highest probability of belonging to the topic (e.g., based on the frequency of their appearance in trip purposes associated with the topic).

Ensemble classifier 110 may comprise a topic model that associates topics with sets of words from trip purposes, a topic prediction model that predicts one or more topics based on travel data, and a purpose prediction model that predicts one or more trip purposes based on one or more topics (e.g., predicted by the topic prediction model) using words in the topic model that correspond to the one or more topics and the corresponding trip's travel data. As such, the different models of ensemble classifier 110 work together to predict trip purposes based on travel data, while potentially using a combination of different techniques (e.g., different types of supervised and unsupervised machine learning techniques).

Model training module 112 may generate a topic model comprising a plurality of topics as part of ensemble classifier 110 based on statistical analysis of trip purposes included in labeled travel data, and each in the topic model may include a set of words from the trip purposes that are associated with the topic. Model training module 112 may train the topic prediction model of ensemble classifier 110 based on topics determined from the trip purposes (e.g., in the process of generating the topic model) and features determined from the trip records. Model training module 112 may train the purpose prediction model of ensemble classifier 110 based on the topics and the trip purposes. In certain embodiments, supplemental data (e.g., user data) is also used to train the first and purpose prediction model in order to provide a more user-specific prediction. In alternative embodiments, a single predictive model may be used in place of ensemble classifier 110. For example, if a user only uses pre-defined trip purposes (e.g., fixed trip purposes, such as trip purposes defined by the tax agency, rather than user-defined trip purposes), it may be unnecessary to include the intermediary step of topic prediction based on statistical analysis of trip purposes. As such, trip purposes may be predicted by a single prediction model that is trained using pre-defined trip purposes and trip records.

Trip purposes predicted by ensemble classifier 110 may be provided as recommended trip purposes to a user via a user interface so that the user may quickly label a trip or a group of trips with a minimal input (e.g., a single interaction with a graphical user interface, such as clicking on one user interface element like a button). The predicted trip purposes are sent back to production database 106 so that they may be subsequently transmitted back to a user as recommended trip purposes, such as back to the mobile application running on user device 102.

In some examples, each prediction model of ensemble classifier 110 is a user-specific prediction model based on labeled travel data and feedback from the user. In this way, ensemble classifier 110 may be user-centric and thus flexible and adaptive to a wide variety of user types.

Ensemble classifier 110 receives unlabeled travel data as input from data warehouse 108 and outputs predicted trip purposes. In some examples, ensemble classifier 110 comprises one or more types of classification models, such as a Naïve Bayes classification model, logistic regression, decision tree, random forest, gradient-boosted tree, multilayer perceptron, and others may also be used in ensemble classifier 110. A Naïve Bayes classification model is based on the concept of dependent probability i.e., what is the chance of some outcome given some other outcome. A logistic regression model takes some inputs and calculates the probability of some outcome, and the label may be applied based on a threshold for the probability of the outcome. For example, if the probability is >50% then the label is A, and if the probability is <=50%, then the label is B. A decision tree makes a classification by dividing the inputs into smaller classifications (at nodes), which result in an ultimate classification at a leaf. A random forest extends the concept of a decision tree model, except the nodes included in any give decision tree within the forest are selected with some randomness. Thus, random forests may reduce bias and group outcomes based upon the most likely positive responses. Gradient boosting is a method for optimizing decision-tree based models.

In some cases, one or more of production database 106, data warehouse 108, ensemble classifier 110, and model training module 112 may be resident, individually or collectively, on one or more servers. For example, in some cases production database 106 is resident on an external network facing server, while data warehouse 108 is on a non-externally accessible server. Further, model training module 112 and ensemble classifier 110 may be resident on special-purpose, high-performance servers in data communication with production database 106 and data warehouse 108.

Notably FIG. 1 is depicted with a selected group of features for clarity and simplicity, but there may be many additional elements of system 100. For example, production database 106 may be behind a firewall and accessible only via a gateway or application programming interface (API).

System 100 for recommending trip purposes to users of an application has many uses, including, for example, predicting and recommending trip purposes for a personal or business finance application (mobile or desktop). As discussed above, this allows users of such applications to quickly label trip records with trip purposes, which saves the users significant time and effort. Further, predicting trip purposes via system 100 may allow for automatic identification and prioritization of high-value business trips for users so they can maximize their tax deductions.

The predicted trip purposes can be used as the basis of suggested rules for users. For example, a suggested rule based on the predictions can be presented to a user (e.g., through a graphical user interface of mobile device 102) and the user can confirm or change the suggested rule before accepting. Such rules may then automatically label future trip records (e.g., with a particular trip purpose) based on the criteria in the rule (e.g., the process of predicting topics and then predicting purposes based on topics may be bypassed in these cases). For example, a rule may state "always label trips from start location A to end location B with a trip purpose of 'meeting with client.'" Thus, the initial predictions from ensemble classifier 110 may further enhance the application by automating rule generation, which in-turn further increase the efficiency of labeling trip records.

Further yet, the predictions provided by system 100 may be used as inputs to other predictive algorithms. For example, trip record patterns may be used as a proxy for a user's profession or industry, and that information may be used to further personalize the user's experience. Returning to the ride-sharing example discussed above, a user taking many trips every day in different areas may be more likely to be working in the ride-share industry. Such a determination (i.e., of a predicted industry) may be used as weighted data for another model (e.g., weighted based on the confidence of the prediction).

The predicted trip purposes generated by system 100 may also be used to improve the ensemble classifier 110 because the predictions can generate user feedback as to the correctness of the predicted trip purposes (e.g., through AB testing). Improvements could include, for example, re-prioritizing the criteria used for predicting trip purposes. For example, if a user always dismisses trip purposes based on a certain criteria such as start location, model training module 112 may use that feedback as an input for training ensemble classifier 110, which may result in the certain criteria no longer being used or being used less frequently for predicting trip purposes for the user.

Example Process Flow for Recommending Trip Purposes

Figure 2:
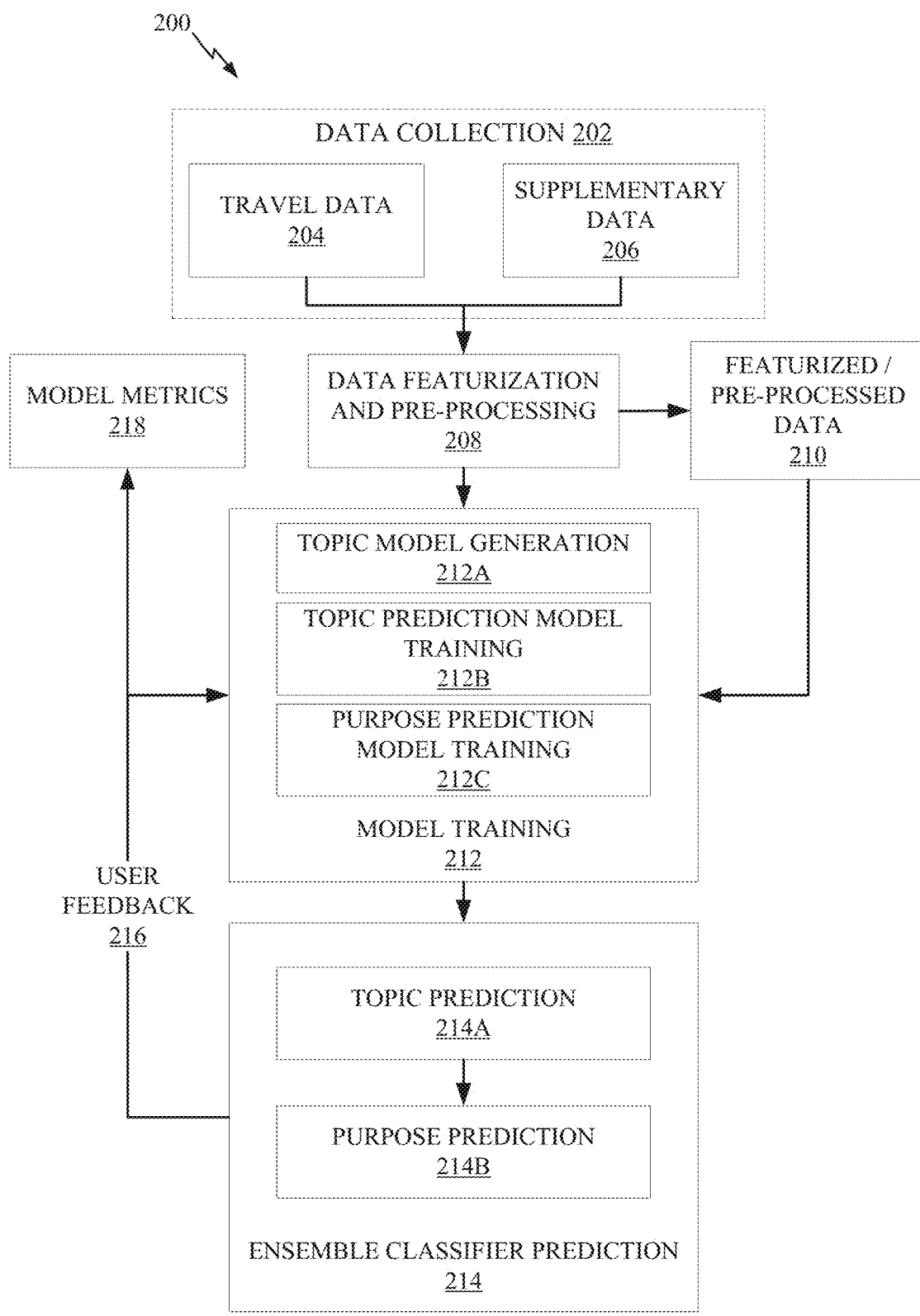
FIG. 2 depicts a process flow for recommending trip purposes to users of an application.

FIG. 2 depicts a process flow 200 for recommending trip purposes. Process 200 begins with data collection step 202. For example, travel data 204 may be collected from users, such as from applications running on user devices, as described above with respect to FIG. 1. Travel data may include trip records that include, for example, location coordinates (e.g., GPS coordinates) for starting and ending points of a trip as well as time data (e.g., start and end time of a trip). As described above, travel data may also include other metadata about the trip. A subset of travel data 204 may be labeled with trip purposes provided by users.

Other, supplementary data 206 may also be collected to improve the training of prediction models in step 212. For example, supplementary data 206 may include: user-specific data, such as a user's industry or login behavior; travel metadata, such as location names (as provided through map APIs or other models; and other types of data that is related to users and trips performed by users.

The data collected during data collection step 202, such as travel data 204 and supplementary data 206, may be featurized and pre-processed in data featurization and pre-processing step 208. Featurization and pre-processing may include an ensemble of data preparation and transformation steps to remedy inherent issues in large data sets, such as inconsistent data sources, missing values, inconsistent or incompatible data types (e.g., structure/categorical, unstructured, time series, etc.), noisy or dirty data, skewed data, and other known issues. Further, transformations included as part of data featurization and pre-processing 208 may better prepare the data for use with machine learning techniques. Example transformation techniques include: normalization or standardization, categorization, dummification of categorical variables, binning, dimensionality reduction, filtering, new feature creation based on formulas, feature hashing, natural language processing (NLP), token annotation, bag-of-words vectorization, sentence annotation, speech element identification, lemmatization or stemming, generating n-grams, and others.

In certain embodiments, pre-processing trip purposes (e.g., user-defined trip purposes) included in travel data to prepare the trip purposes for topic modeling includes consolidating sentences, removing proper nouns and locations, removing single non-informative word trip purposes, lemmatizing trip purposes, and/or converting trip purposes to bag-of-words format. A word may be determined to be "non-informative" if it is not indicative of trip purpose. For example, "Bob" and "starting" may be determined to be non-informative words, while "rideshare" and "commuting" may be determined to be informative words. Consolidating sentences in trip purposes includes, for example, using a Levenshtein distance (LD) or word embedding (e.g., averaging word vectors that compose a trip purpose) as a measure of similarity between two sentences and consolidating similar sentences. Proper nouns, locations (e.g., city, state, street names), and single word trip purposes may be removed due to the fact that these words are unlikely to be indicative of topic (e.g., for topic modeling based on the trip purposes). Lemmatizing involves reducing inflectional forms and sometimes derivationally related forms of a word to a common base form (e.g., grouping inflected or variant forms of the same word). Bag-of-words vectorization involves representing text (such as a trip purpose) as a bag (multiset) of its words, disregarding grammar and word order but keeping multiplicity. In other words, bag-of-words vectorization comprises separating each trip purpose into a set of words without regard for word order or other context. Pre-processing trip purposes helps reduce noise such as improper spellings, unbalanced data based on industry spread (e.g., if there are a lot of users from the rideshare industry, there are likely more trip purposes that are relevant for users in this industry than users in other industries, which may be remedied by consolidation techniques), duplicative language, and other sources of noise.

In the context of the travel data, featurization may include transformations such as extracting time of day, day of week, etc. from a timestamp of when a trip started or ended, distance travelled in one trip based on start location and end location, and getting more coarse location coordinates based on more fine grained ones. For example, if there are different locations where someone parks their car around their home, they can all be considered as one location within a bigger radius around their home. Further, featurization may include predicting "hot spots", which are defined region (e.g., encompassing a plurality of locations) that are associated with certain classification data and/or other descriptive data that assists in labeling future trips with origin locations or destination locations that fall within the hot spot. By way of example, a hot spot may encompass a region such as a city block, neighborhood, entire town, or other regions that a given user may frequent for a particular purpose. Methods for predicting and using hot spots are described in Applicant's co-pending U.S. application Ser. No. 15/913,812, filed Mar. 6, 2018, which is hereby incorporated by reference in its entirety.

While data featurization and pre-processing 208 and model training 212 are shown as distinct steps in process 200 in FIG. 2, this is only one example. Other processes, such as deep learning, may effectively combine these individual process steps, e.g., by pre-processing data, learning features, and training the models together.

Data that is featurized and pre-processed at step 208 is stored in a featurized/pre-processed data repository at step 210 in addition to being used for model training at step 212.

Model training 212 takes data from data featurization and pre-processing 208 and/or from stored featurized/pre-processed data 210 and partitions the featurized/pre-processed data into, for example, a training data set, which may include a range of data prior to a set date, as well as a test data set, which may include a range of data after the set date. For example, training data may comprise featurized/pre-processed data from three months prior to a set date and test data may comprise featurized/pre-processed data from a week to a few weeks (e.g., one to four weeks) after the set date. Notably, these timelines for defining data sets are just examples and other timelines may be used.

In one example, model training step 212 may include creating user-specific models that are personalized to each user for which there is sufficient data. For example, if a user has sufficient travel data that is already labeled with trip purposes (e.g., for use in generating the topic model, training the topic prediction model, and training the purpose prediction model), then personalized models may be trained for the user during step 212.

In another example, model training step 212 may include creating multi-user (e.g., industry-specific) models. Such models may be created when supplementary data 206 collected during the data collection step 202 enables matching users by shared attributes, such as industry. For example, a new user in the ride-share industry may not have sufficient personal travel data to train user-specific models, but the travel data labeled with trip purposes by other users in the same industry may provide a basis for training models applicable to the new user. Consequently, even new users with small user-specific data sets benefit from the creation of multi-user (e.g., industry) models.

In yet another example, model training step 212 may include creating user-specific models based on another user that is similar to the user according to supplementary data 206. For example, one or more attributes of a new user (e.g., industry) without significant travel data may match one or more existing users with significant travel data, and this may form the basis of creating initial models for the new user based on the existing user with matching attributes. So a new user starting to capture ride-sharing travel data may benefit from user-specific models based on another user with significant ride-sharing travel data. In this regard, ride-sharing is just one example, and users may be matched based on many other attributes.

Model training step 212 includes topic model generation 212A, topic prediction model training 212B, and purpose prediction model training 212C, each of which may be user-specific or multi-user-specific as described above Topic model generation 212A includes building a topic model of an ensemble classifier, the topic model including a plurality of topics determined based on statistical analysis of trip purposes. For example, an unsupervised generative topic modeling technique may be used to identify topics in the trip purposes and generate the topic model. The topic model includes a set of words related to each topic from the trip purposes, which may represent the words with the highest probability of being associated with the topic. In one example, a form of latent dirichlet allocation (LDA) that assigns a single topic to each trip purpose is used to generate the topic model (e.g., by analyzing the semantic structure of trip purposes). LDA techniques generally involve treating a corpus as a set of documents (e.g., trip purposes are "documents") and assigning topic to each document (e.g., in the present solution, only one topic is assigned to each trip purpose because trip purposes are short, generally containing less than 255 characters). In certain embodiments, topic modeling techniques that assign two topics per document may be used in addition to or instead of LDA techniques in generating the topic model. In general, any short-text topic modeling techniques may be used in generating the topic model based on trip purposes. In certain embodiments, each topic in the topic model is associated with words from trip purposes that are ranked or ordered according to the frequency with which they appear in trip purposes associated with the topic.

Topic prediction model training 212B includes training a topic prediction model of the ensemble classifier using the trip records and the topics identified during topic model generation 212A to predict a topic based on a trip record. In some embodiments, a supervised multinomial classification technique (e.g., logistic regression, gradient boosted random forest, or another type of model) is used to train the topic prediction model at step 212B. The topic prediction model is trained to receive featurized travel data as an input and map the featurized travel data to one or more topics, outputting identifiers of the one or more topics.

Purpose prediction model training 212B includes training a purpose prediction model of the ensemble classifier using the topic model and the trip purposes to predict a trip purpose based on a topic. For example, supervised techniques may be used to train the purpose prediction model based on associations between topics and words in the topic model and associations between words and trip purposes that contain the words. The purpose prediction model may be trained to output one or more trip purposes based on an input topic (e.g., the purpose prediction model is trained using the topic model to determine trip purposes that include the words that are associated with an input topic).

The output of the model training step 212 (including steps 212A-C) may include an ensemble classifier that comprises a topic model, a topic prediction model, and a purpose prediction model, which may be user-specific and/or multi-user specific models. For example, each model may comprise one or more patterns that indicate if travel data (e.g., a trip record) is associated with a particular topic or if a topic is associated with a particular trip purpose (for a particular user or for users in general).

In an alternative embodiment, such as for cases where users only use pre-defined trip purposes, a single supervised multinomial classification model may be trained to directly predict trip purposes without the use of topic modeling. For example, the supervised multinomial classification model may be trained based on statistical correlations between specific trip purposes and features of trip records without analyzing the semantic structure of trip purposes and creating the topic model.

At step 214, the trained models that make up the ensemble classifier are used to predict trip purposes based on received data, such as travel data that has not been labeled with trip purposes.

In one example, at topic prediction 214A, a featurized trip record that is not labeled with a trip purpose and is associated with a user is provided as input to the topic prediction model. The topic prediction model outputs a topic (or, in some cases, a set of topics ordered based on probability) based on the featurized trip record. At purpose prediction 214B, the topic output by the topic prediction model is provided as input to the purpose prediction model (e.g., which was trained based on the topic model and the trip purposes). The purpose prediction model outputs a trip purpose (or, in some cases a set of trip purposes ordered based on probability, which may be based on probability distributions of words in the trip purposes) based on the input topic. If the purpose prediction model is user-specific, then the purpose prediction model outputs a trip purpose or ordered set of trip purposes selected from trip purposes that were previously provided by the user for other trip records based on the probabilities of words in the one or more trip purposes being associated with the topic (e.g., according to the training of the purpose prediction model). If the purpose prediction model is not user-specific, then the purpose prediction model may choose from trip purposes provided by similar users (e.g., users that share similar personal user data with the user, such as users with the same occupation as the user). In some embodiments, predicting trip purposes involves calculating the product of each topic specific purpose probability and the probability of each purpose belonging to that topic in order to attain an ordered list of predicted trip purposes. One or more of the predicted trip purposes are then presented to the user in a user interface, ordered based on probability, as recommended trip purposes.

The model predictions made by the ensemble classifier at step 214 may be utilized by user applications, such as personal or business finance applications. In some cases, such applications include graphical user interfaces to present the predicted trip purposes to the user. The user may review the predicted trip purposes and either confirm one of the predicted trip purposes for a trip record or disconfirm all of the recommended trip purposes (e.g., the user may specify an alternative trip purpose that is different from the recommended trip purposes or simply fail to confirm any of the recommended trip purposes). The ensemble classifier predictions at step 214 may result in user feedback 216.

User feedback 216 may be used to further refine the models, such as by providing additional labeled data of known correctness (i.e., ground truth data). Further, user feedback 216 may be stored in metric data repository, such as model metrics repository 218, to measure overall performance of the models and other aspects of process 200. For example, metrics such as precision and recall may be calculated for each user-specific model as well as each multi-user model. Other metrics include accuracy of the purpose prediction based on the similarity of the predicted purpose to that which the user provides (e.g., by confirming the predicted trip purpose or providing an alternate trip purpose). For example, if the predicted purpose is "meeting with client" and the user confirms the predicted purpose, then the accuracy metric will be at its maximum value. If the user provides "meeting with Bob" as an alternate purpose, then the accuracy metric may have a mid-range value due to the similarity between the predicted purpose of "meeting client" and the user-provided purpose. If the user provides "driving for rideshare" as an alternate purpose, then the accuracy metric will have a minimum value based on the lack of similarity between the predicted purpose of "meeting with client" and the user-provided purpose. In some cases, the median performance of all individual models may indicate the overall performance of a system for recommending trip purposes, such as described with respect to FIG. 1.

FIG. 3 depicts a set of example topic model related to recommending trip purposes to users of an application. For example, topic models like topic model 300 may be part of ensemble classifier 110 of FIG. 1.

Topic model 300 includes a plurality of topics (e.g., with topic numbers of 0-5), each topic including a plurality of words that are associated with the topic. Topic model 300 may be generated as described above with respect to topic model generation 212A of FIG. 2, such as using LDA techniques based on statistical analysis of trip purposes included in travel data from users or from a particular user. As described above, a "topic" may represent an abstraction that is determined based on statistical analysis of a plurality of trip purposes, and comprises a set of words that are determined to be associated with one another. The words associated with each topic in the topic model represent the words that that have the highest probability of belonging to the topic (e.g., based on the frequency of their appearance in trip purposes associated with the topic). It is noted that the words and numbers shown in topic model 300 are merely included as examples, and topic model 300 may include any number of words and any number of topics.

In topic model 300, topic "0" generally represents trips related to the multimedia profession, such as photography, and includes the words "shoot travel photo wedding rehearsal trip location event session video client." Topic "1" generally represents trips related to supply runs, office expense pickups, and errands, and includes the words "supplies pick office drop work delivery picking business trip materials pickup." Topic "2" generally represents trips related to commuting between work locations, and includes the words "office work client job travel visit drive trip customer back driving commute." Topic "3" generally represents trips related to consulting work, and includes the words "showings project lesson walk support tutoring inc onsite consulting case hours." Topic "4" generally represents trips related to sales, and includes the words "business trip travel client office training sales meet event networking meetings." Topic "5" generally represents trips related to the rideshare profession, and includes the words "uber lyft driving delivery work route rideshare ride trip pick mileage drop." Topic model 300 may be used, along with trip purposes, to train a purpose prediction model to predict a trip purpose based on a topic. Accordingly, predicted trip purposes may be recommended to users of an application, such as using techniques described above with respect to FIGS. 1 and 2 and below with respect to FIGS. 4-7. For example, a topic prediction model may be provided with a featurized trip record from a user that is not labeled with a trip purpose, and the topic prediction model may output a topic based on the trip record. In one example, the topic prediction model outputs topic "5" (e.g., the topic prediction model determines based on the features of the trip record that the trip record relates to the rideshare profession). The topic "5" is then input into a purpose prediction model that has been trained using topic model 300 and trip purposes. In particular, the words included in topic model 300 for topic "5" are used (e.g., according to the training of the purpose prediction model) to predict a trip purpose for the trip record. Because topic "5" includes the words "uber lyft driving delivery work route rideshare ride trip pick mileage drop," these words are used to determine the one or more most probable trip purposes for the trip record (e.g., based on the occurrences of these words in trip purposes of the user, if available, or of similar users). The words associated with the topic in the topic model may be associated with a plurality of trip purposes (e.g., a variety of different trip purposes may include the words associated with a topic), and so the purpose prediction model may determine which trip purposes have the highest number of occurrences of these words. The purpose prediction model may output only the single trip purpose with the highest number of occurrences of the words in the topic model for the topic, all trip purposes that contain at least one word in the topic model for the topic (e.g., as an ordered set that is ordered based on probability), or a set containing any trip purposes with a probability that exceeds a threshold (e.g., based on occurrences of the topic-related words in the trip purposes). The one or more predicted trip purposes are then provided to the user via a user interface as recommended trip purposes for the trip (e.g., "driving for rideshare" or "dropping of client for Uber"). User feedback that confirms or rejects the recommended trip purposes is used to further train the models.

Figure 4A:
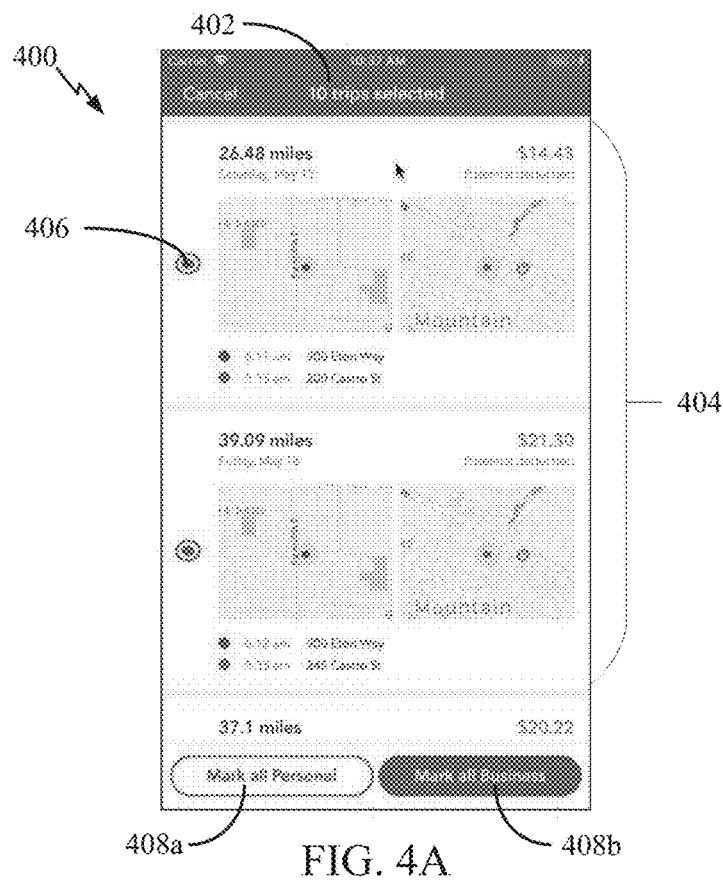
FIGS. 4A and 4B depict examples of a user interface for recommending trip purposes to users of an application.
Figure 4B:
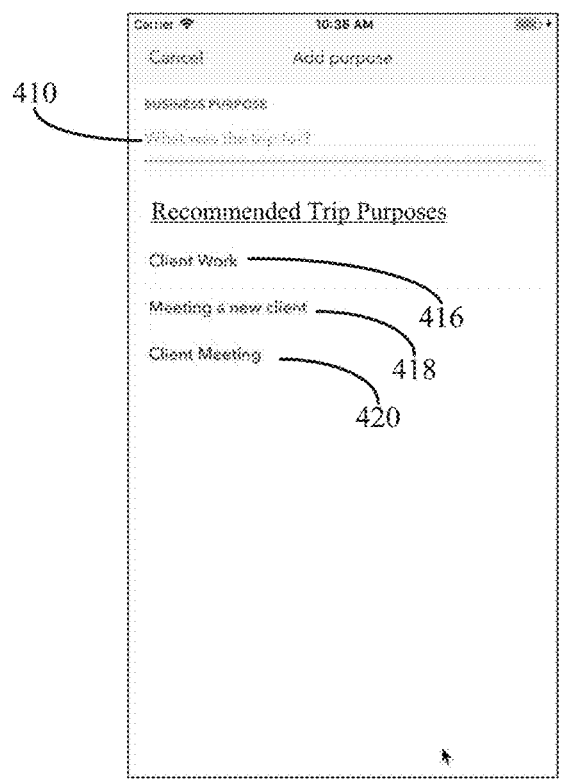

FIGS. 4A-4B depict examples of a user interface 400 for recommending trip purposes based on travel data, such as trip records.

In particular, FIG. 4A shows a screen of a user interface 400 of an application that runs on a mobile device, such as mobile device 102 described with respect to FIG. 1. In some examples, the application may be a personal or business finance application. User interface 400 includes a user interface element 402, in this case a banner indicator, which denotes a number of trips that have been grouped together for review. In the depicted example, ten trip records 404 have been grouped together. It is noted that embodiments of the present disclosure may be implemented without grouping. For example, recommended trip purposes as shown and described below with respect to FIG. 4B may be provided for a single trip, rather than a group of trips. FIG. 4A is only included as one example of a user interface screen that may precede presenting recommended trip purposes to a user.

User interface 400 includes user interface element 406, which in this example is a selectable radio button, which allows a user to exclude automatically grouped trip records from a group. For example, if a user scrolled through the group and noticed that one trip was not appropriately grouped, the user could de-select that particular trip record and thereafter label the remaining trips in the automatically generated group.

In the example of FIG. 4A, the group of trip records has been grouped by similarity (e.g., the trip records may have been grouped based on features indicating that the trips are all likely to be labeled as business trips with the same trip purpose) by a model, but the label (e.g., classification as business or personal) of the group is up to the user to determine via use of one of user interface elements 408a and 408b, which in this case are buttons for labeling all trip records in the group as either "Personal" (via button 408a) or as "Business" (via button 408b).

When a user selects to, for example, "Mark all Business" via button 408b in user interface 400, the user interface screen shown in FIG. 4B may be presented to the user so that the user may label the business trips with a trip purpose. It is noted that the user may alternatively label each trip individually with a trip purpose. Trip records may, however, be grouped based on features indicating that the trip records are likely to share a common trip purpose.

FIG. 4B depicts another screen of user interface 400 in which additional user interface elements are demonstrated. For example, user interface element 410 is a field that allows a user to assign a trip purpose to a trip or group of trips (e.g., following the trip or group of trips being marked as business trips, such as using the user interface screen shown in FIG. 4A). Recommended trip purposes 416, 418, and 420 are shown to the user. For example, trip purposes 416, 418, and 420 may be trip purposes predicted using ensemble classifier 110.

It is noted that, while FIG. 4B shows the text "Recommended Trip Purposes" above recommended trip purposes 416, 418, and 420, other embodiments are possible. For example, different text may alternatively be displayed above recommended trip purposes 416, 418, and 420.

The user may confirm one of the recommended trip purposes by selecting one of 416, 418, or 420, or the user may enter a different trip purpose in field 410, thereby rejecting all of the recommended trip purposes 416, 418, and 420. If the recommended trip purposes are for a group of trip records (e.g., following the screen shown in FIG. 4A), then the recommended trip purpose selected by the user is applied to all trip records in the group. Alternatively, if the recommended trip purposes are for a single trip record, then the selected trip purpose is only applied to the single trip record.

User feedback (e.g., confirming one of recommended trip purposes 416, 418, and 420 or rejecting them) is used to further train the models (e.g., the models of ensemble classifier 110 of FIG. 1) to improve future predictions. For example, if the user confirms recommended trip purpose 416, then the criteria used to predict recommended trip purpose 416 may be used again or more frequently to predict trip purposes under similar circumstances (e.g., with similar travel data).

Though FIGS. 4A-4B depict a user interface 400 on a mobile device, the same concepts of recommending trip purposes are equally applicable to other types of computing devices, such as tablets, laptop and desktop computers, smart wearable devices, and other electronic devices with display and user input capabilities.

Figure 5:
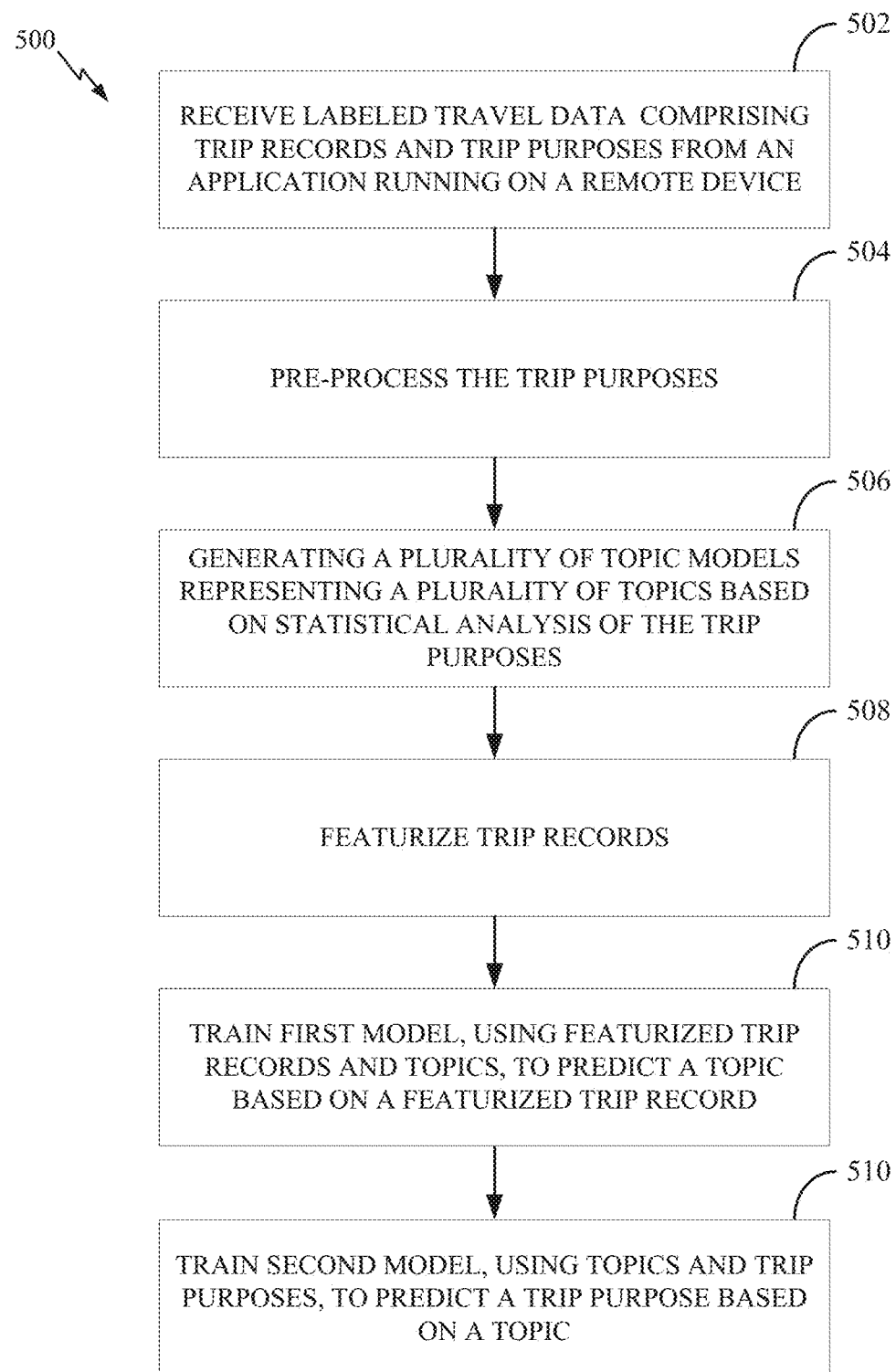
FIG. 5 depicts a method for training models related to recommending trip purposes to users of an application.

FIG. 5 depicts a method 500 for recommending trip purposes to a user of an application.

Method 500 begins at step 502 with receiving labeled travel data including trip records and trip purposes from an application running on a remote device. The travel data may be like travel data 204 described above with respect to FIG. 2. For example, the travel data comprises a plurality of trip records, and each trip record of the plurality of trip records comprises at least a start location, an end location, a trip mileage associated, and a time associated with a trip. Each trip record is further associated with a user-provided trip purpose.

The remote device may be any sort of external computing device that is reachable via a data connection. In some embodiments, the remote device may be mobile device, such as a smartphone, or such as described above with respect to FIG. 1. In other embodiments, the remote device may be a laptop or desktop computer, server, or other non-mobile computing resource.

Method 500 then proceeds to step 504 with pre-processing the trip purposes. As discussed above with respect to FIG. 2, trip purposes may be pre-processed by consolidating sentences, removing proper nouns and locations, removing single word trip purposes, lemmatizing trip purposes, and/or converting trip purposes to bag-of-words format.

Method 500 then proceeds to step 506 with generating a topic model representing a plurality of topics based on statistical analysis of the trip purposes. As discussed above with respect to FIGS. 1-3, each topic in the topic model represents a topic that is identified based on statistical analysis of the trip purposes, and is associated with a set of words that that have the highest probability of belonging to the topic (e.g., based on the frequency of their appearance in trip purposes associated with the topic).

Method 500 then proceeds to step 508 with featurizing the trip records. For example, as discussed above with respect to FIGS. 1 and 2, featurizing encompasses an ensemble of data preparation and transformation steps to remedy inherent issues in large data sets, and involves determining one or more features based on the trip records for use in training models.

Method 500 then proceeds to step 510 with training a topic prediction model, using the featurized trip records and the plurality of topics (e.g., determined at step 506), to predict a topic based on an input featurized trip record. For example, supervised multinomial classification techniques may be used to train the topic prediction model based on input features from the featurized trip records and topics that are associated with the trip records. In certain embodiments, the topic prediction model is part of an ensemble classifier.

Method 500 then proceeds to step 512 with training a purpose prediction model, using the topic model and the trip purposes, to predict a trip purpose based on an input topic. For example, the purpose prediction model may be trained to retrieve a topic from the topic model based on the input topic (e.g., which may be an identifier), and use the topic model to predict a trip purpose based on the probabilities of words associated with the topic in the topic model and words in the trip purposes. In certain embodiments, the purpose prediction model is part of an ensemble classifier.

Though not depicted in FIG. 5, in some examples, method 500 may further include receiving supplementary data, such as supplementary data 206 described above with respect to FIG. 2, associated with a user of the application. The supplementary data may be used for creating one or more supplementary data features based on the supplementary data, wherein each of the one or more supplementary data features is an input to one or more of the models. The supplementary data features may then be provided to the models to improve the predictive capability of the models.

In some examples of method 500, the travel data and the supplementary data are associated with a user of the application, and the models (e.g., of the ensemble classifier) are specific to the user.

In some examples, method 500 may further include receiving user feedback from the application running on the remote device. Thereafter, the user feedback is provided to the model training module to further refine user-specific models or multi-user specific models. The revised models (based on the user feedback) may then provide new predictions, which are then transmitted to the application running on the remote device.

In some examples, method 500 may further include calculating model metrics, such as those model metrics 218 described above with respect to FIG. 2. In one example, a model metric includes one or more of a precision metric and a recall metric based on the user feedback. In some examples, the model metrics are stored in a data repository and may be further used to refine various prediction models. For example, where a model metric is insufficient compared to a threshold, a model may be re-trained or an alternate model may be used for a user, such as a multi-user model. This may be useful where, for example, a new user has not yet provided enough travel data to train a model of sufficient performance according to predetermined performance thresholds.

In some examples, an apparatus, including a memory comprising executable instructions and a processor in data communication with the memory and configured to execute the executable instructions, may be configured to cause the apparatus to perform a method for recommending trip purposes to a user of an application, such as method 500 (or any combination of the steps described above with respect to method 500).

In some examples, a non-transitory computer-readable medium comprises instructions that when executed by a processor of an apparatus cause the apparatus to perform a method for recommending trip purposes to a user of an application, such as method 500 (or any combination of the steps described above with respect to method 500).

Figure 6:
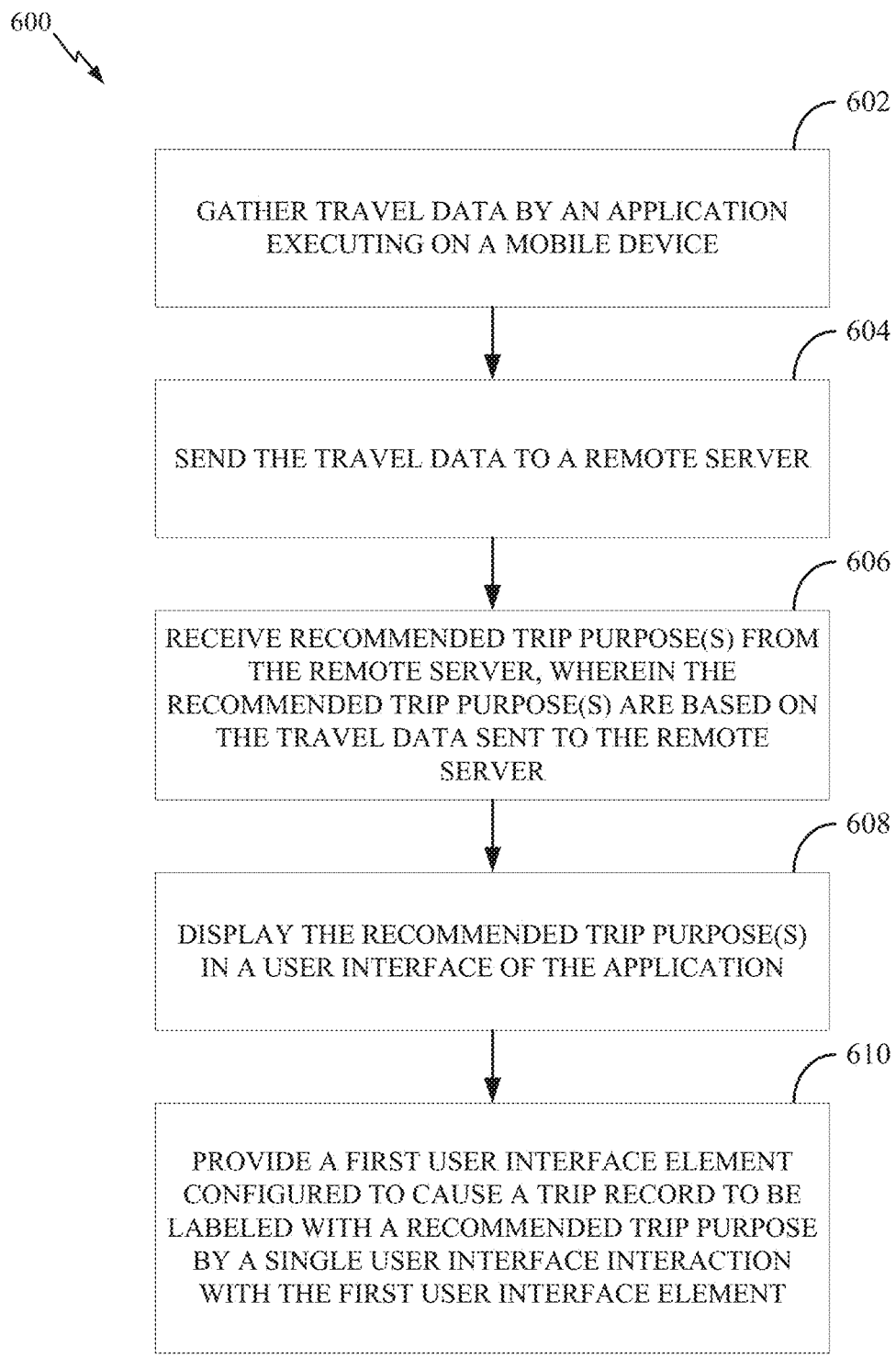
FIG. 6 depicts a method for recommending trip purposes to users of an application in a user interface of the application.

FIG. 6 depicts a method 600 for providing recommended trip purposes in a user interface of an application. In some examples, the user interface relates to a mobile application running on a mobile device, such as a smartphone.

Method 600 beings at step 602 with gathering travel data by an application executing on a mobile device. In some examples, gathering the travel data includes using a satellite-based location determination capability of the mobile device, such as a Global Positioning System (GPS), Global Navigation Satellite System (GLONASS), or other similar satellite-based positioning system. The travel data may be like travel data 204 described above with respect to FIG. 2. In some examples, gathering travel data includes, for each trip of a plurality of trips, one or more of: determining a start location of the trip; determining an end location of the trip; determining a mileage of the trip; and determining a start and end time associated with the trip.

Method 600 then proceeds to step 604 with sending the travel data to a remote server. For example, the travel data may be gathered by a mobile device, such as mobile device 102 described with respect to FIG. 1, and then sent to a remote server, such a remote server hosting a production database like production database 106 in FIG. 1.

Method 600 then proceeds to step 606 with receiving one or more recommended trip purposes from the remote server, wherein the one or more recommended trip purposes are based on the travel data sent to the remote server. For example, as depicted in FIG. 1, mobile device 102 receives one or more recommended trip purposes from production database 106.

Method 600 then proceeds to step 608 with displaying the one or more recommended trip purposes in a user interface of the application. For example, the recommended trip purpose(s) may be displayed in a user interface like user interface 400 described with respect to FIG. 4B. In certain embodiments, the recommended trip purposes are received as an ordered list based on the probability of the trip purposes, and the recommended trip purposes are displayed in the order they appear in the list.

Method 600 then proceeds to step 610 with providing a first user interface element configured to cause a trip record to be labeled with one of the one or more trip purposes by a single user interface interaction with the first user interface element. For example, the first user interface element may be a button or link like 416, 418, and 420 in FIG. 4B, which in this example are configured for labeling one or more trip records with one of the particular recommended trip purposes.

Though not depicted, method 600 may further include detecting a user interface interaction with the first user interface element, such as a button or link like 416, 418, and 420 in FIG. 4B, and thereafter transmitting user feedback to the remote server based on the user interface interaction. For example, the user interface interaction could indicate that a recommended trip purpose for one or more trip records is correct based on the user selecting a user interface element to label a trip record with the same label (e.g., the recommended trip purpose).

In some examples, method 600 further includes receiving a user rejection of the recommended trip purpose displayed in the user interface, the rejection indicating that the recommended trip purpose does not apply to the trip record, and sending user feedback to the remote server based on the rejection. For example, as described with respect to FIG. 4B, a user can use another user interface element, such as field 410, to provide input that specifies an alternate trip purpose that is different from the recommended trip purpose(s). After the user rejects a recommended trip purpose, user feedback based on the rejection may be sent to a remote server, such as a server hosting production database 106 in FIG. 1. The feedback may be used to further refine one or more prediction models of the ensemble classifier.

In some examples, method 600 includes providing a second user interface element in the user interface configured to allow the user to specify a trip purpose, such as field 410 depicted in FIG. 4B.

In some examples, an apparatus, including a memory comprising executable instructions and a processor in data communication with the memory and configured to execute the executable instructions, may be configured to cause the apparatus to perform a method for recommending trip purposes to a user of an application, such as method 600 (or any combination of the steps described above with respect to method 600).

In some examples, a non-transitory computer-readable medium comprises instructions that when executed by a processor of an apparatus cause the apparatus to perform a method for recommending trip purposes to a user of an application, such as method 600 (or any combination of the steps described above with respect to method 600).

Figure 7A:
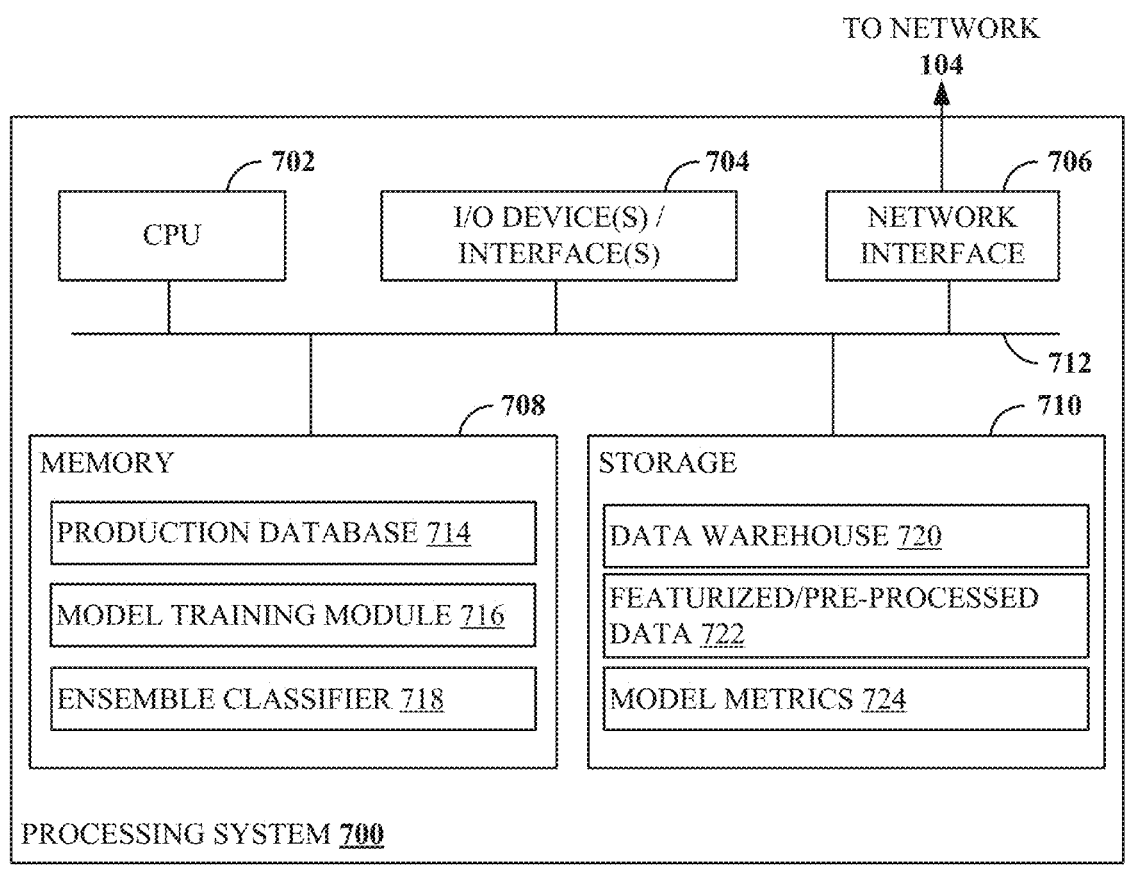
FIGS. 7A and 7B depict processing systems configured to recommend trip purposes to users of an application.

FIG. 7A depicts a processing system 700 configured to recommend trip purposes to a user of an application. Processing system 700 includes a CPU 702 connected to a data bus 712. CPU 702 is configured to process computer-executable instructions, e.g., stored in memory 708 or storage 710, and to cause processing system 700 to perform methods as described herein, for example with respect to FIGS. 1-5. CPU 702 is included to be representative of a single CPU, multiple CPUs, a single CPU having multiple processing cores, and other forms of processing architecture capable of executing computer-executable instructions.

Processing system 700 further includes input/output devices and interface 704, which allows processing system 700 to interface with input/output devices, such as, for example, keyboards, displays, mouse devices, pen input, and other devices that allow for interaction with processing system 700. Note that while not depicted with independent external I/O devices, processing system 700 may connect with external I/O devices through physical and wireless connections (e.g., an external display device).

Processing system 700 further includes network interface 706, which provides processing system 700 with access to external computing devices, such as described with respect to FIG. 1.

Processing system 700 further includes memory 708, which in this example includes production database 714, which may be like production database 106 described above with respect to FIG. 1. Memory 708 also includes model training module 716, which may be like model training module 112 described above with respect to FIG. 1. Memory 708 also includes ensemble classifier 718, which may be like ensemble classifier 110 described above with respect to FIG. 1. Note that while shown as a single memory 708 in FIG. 7A for simplicity, the various aspects stored in memory 708 may be stored in different physical memories, but all accessible CPU 702 via internal data connections, such as bus 712.

Processing system 700 further includes storage 710, which in this example includes data warehouse 720, which may be like data warehouse 108 described above with respect to FIG. 1. Data warehouse 720 may store, for example, travel data and supplementary data, such as travel data 204 and supplementary data 206 described above with respect to FIG. 2. Storage 710 also includes featurized/pre-processed data 722, which may be like featurized/pre-processed data 210 described above with respect to FIG. 2. Storage 710 also includes model metrics 718, which may be like model metrics 218 described above with respect to FIG. 2. As with memory 708, a single storage 710 is depicted in FIG. 7A for simplicity, but the various aspects stored in storage 710 may be stored in different physical storages, but all accessible to CPU 702 via internal data connections, such as bus 712.

Figure 7B:
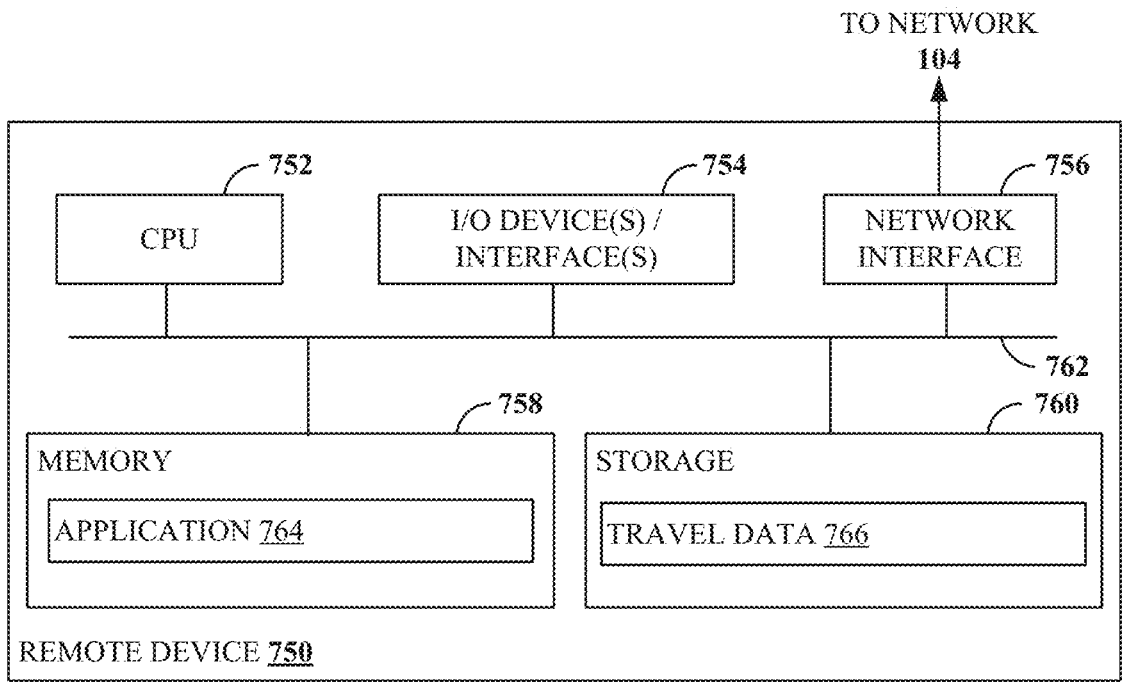

FIG. 7B depicts a remote device 750 configured to present recommended trip purposes to a user of an application. Remote device 750 includes a CPU 752 connected to a data bus 762. CPU 752 is configured to process computer-executable instructions, e.g., stored in memory 758 or storage 760, and to cause remote device 750 to perform methods as described herein, for example with respect to FIGS. 1-4 and 6. CPU 752 is included to be representative of a single CPU, multiple CPUs, a single CPU having multiple processing cores, and other forms of processing architecture capable of executing computer-executable instructions.

Remote device 750 further includes input/output device and interface 754, which allow, for example, a user to interact with remote device 750. For example, a user may interact with trip records and recommended trip purposes as described above with respect to FIGS. 4A-4B. For example, an input/output device of remote device 750 may include a touch-sensitive display screen. Note that while not depicted with independent external I/O devices, remote device 750 may likewise connect with external I/O devices through physical and wireless connections (e.g., a wireless keyboard via a short-range data connection such as Bluetooth).

Remote device 750 further includes network interface 706, which provides processing system 700 with access to external computing devices, such as described with respect to FIG. 1.

Remote device 750 further includes memory 758, which in this example includes application 765, which may be, for example, a personal or business finance application with a trip tracking capability, as described above with respect to FIGS. 4A and 4B. Note that while shown as a single memory 758 in FIG. 7B for simplicity, the various aspects stored in memory 758 may be stored in different physical memories, but all accessible to CPU 752 via internal data connections, such as bus 762.

Remote device 750 further includes storage 760, which in this example includes travel data 766. In some examples, travel data 766 comprises labeled and/or unlabeled trip records as described above. As with memory 758, a single storage 760 is depicted in FIG. 7B for simplicity, but the various aspects stored in storage 760 may be stored in different physical storages, but all accessible to CPU 752 via internal data connections, such as bus 762.

The content and configuration of processing system 700 in FIG. 7A and remote device 750 in FIG. 7B are just one example, and other configurations are possible.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other circuit elements that are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for recommending trip purposes to users of an application, comprising:
   receiving labeled travel data from the application running on a remote device, wherein the labeled travel data comprises a plurality of trip purposes, wherein each trip purpose of the plurality of trip purposes corresponds to a trip record of a plurality of trip records;
   pre-processing the plurality of trip purposes by:
     consolidating sentences in the plurality of trip purposes based on similarities between strings;
     separating each trip purpose of the plurality of trip purposes into a set of words;
     removing trip purposes from the plurality of trip purposes that only contain one non-informative word;
     removing proper nouns from the plurality of trip purposes; and
     grouping inflected or variant forms of a same word;
   building a topic model representing words associated with a plurality of topics based on statistical analysis of the plurality of trip purposes, wherein at least one topic of the plurality of topics is assigned to each of the plurality of trip purposes, wherein building the topic model comprises using an unsupervised generative technique to determine the plurality of topics from the plurality of trip purposes based on probability;

deriving one or more features from each of the plurality of trip records;

training a topic prediction model of an ensemble classifier, using the plurality of topics and the one or more features derived from each of the plurality of trip records, to output a topic based on an input trip record; and training a purpose prediction model of the ensemble classifier, using the topic model and the plurality of trip purposes, to output a trip purpose based on an input topic, wherein the purpose prediction model uses one or more words associated in the topic model with the input topic in determining the trip purpose, wherein the trip purpose comprises the one or more words; and wherein the trip purpose output by the purpose prediction model is recommended to a user via a user interface of the application running on the remote device.

2. The method of claim 1, further comprising:

receiving supplementary data associated with the user; and deriving one or more supplementary features from the supplementary data, wherein each of the one or more supplementary data features is used in training the topic prediction model and the purpose prediction model.

3. The method of claim 2, wherein:

the travel data is associated with the user; and the ensemble classifier is specific to the user.

4. The method of claim 1, further comprising:

receiving user feedback from the application running on the remote device; and training the topic prediction model and the purpose prediction model based on the user feedback.

5. The method of claim 1, wherein: each trip record of the plurality of trip records comprises at least a start location, an end location, a trip mileage associated, and a time associated with a trip.

6. The method of claim 1, wherein the remote device is a smartphone.

7. An apparatus for recommending trip purposes to users of an application, comprising:

a memory comprising executable instructions;

a processor in data communication with the memory and configured to execute the executable instructions and cause the apparatus to perform a method, the method comprising:

receiving labeled travel data from the application running on a remote device, wherein the labeled travel data comprises a plurality of trip purposes, wherein each trip purpose of the plurality of trip purposes corresponds to a trip record of a plurality of trip records;

pre-processing the plurality of trip purposes by:

consolidating sentences in the plurality of trip purposes based on similarities between strings; and separating each trip purpose of the plurality of trip purposes into a set of words;

removing trip purposes from the plurality of trip purposes that only contain one non-informative word;

removing proper nouns from the plurality of trip purposes; and grouping inflected or variant forms of a same word;

building a topic model representing words associated with a plurality of topics based on statistical analysis of the plurality of trip purposes, wherein at least one topic of the plurality of topics is assigned to each of the plurality of trip purposes, wherein building the topic model comprises using an unsupervised generative technique to determine the plurality of topics from the plurality of trip purposes based on probability;

deriving one or more features from each of the plurality of trip records;

training a topic prediction model of an ensemble classifier, using the plurality of topics and the one or more features derived from each of the plurality of trip records, to output a topic based on an input trip record; and training a purpose prediction model of the ensemble classifier, using the topic model and the plurality of trip purposes, to output a trip purpose based on an input topic, wherein the purpose prediction model uses one or more words associated in the topic model with the input topic in determining the trip purpose, wherein the trip purpose comprises the one or more words; and wherein the trip purpose output by the purpose prediction model is recommended to a user via a user interface of the application running on the remote device.

8. The apparatus of claim 7, wherein the method further comprises:

receiving supplementary data associated with the user; and deriving one or more supplementary features from the supplementary data, wherein each of the one or more supplementary data features is used in training the topic prediction model and the purpose prediction model.

9. The apparatus of claim 7, wherein:

the travel data is associated with the user; and the ensemble classifier is specific to the user.

10. The apparatus of claim 7, wherein the method further comprises:

receiving user feedback from the application running on the remote device; and training the topic prediction model and the purpose prediction model based on the user feedback.

11. The apparatus of claim 7, wherein: each trip record of the plurality of trip records comprises at least a start location, an end location, a trip mileage associated, and a time associated with a trip.

12. The apparatus of claim 7, wherein the remote device is a smartphone.

13. A non-transitory computer-readable medium comprising instructions that, when executed by one or more processors of a computing system, cause the computing system to:

receive labeled travel data from an application running on a remote device, wherein the labeled travel data comprises a plurality of trip purposes, wherein each trip purpose of the plurality of trip purposes corresponds to a trip record of a plurality of trip records;

pre-process the plurality of trip purposes by:

consolidating sentences in the plurality of trip purposes based on similarities between strings;

separating each trip purpose of the plurality of trip purposes into a set of words;

removing trip purposes from the plurality of trip purposes that only contain one non-informative word;
removing proper nouns from the plurality of trip purposes; and
grouping inflected or variant forms of a same word;
build a topic model representing words associated with a plurality of topics based on statistical analysis of the plurality of trip purposes, wherein at least one topic of the plurality of topics is assigned to each of the plurality of trip purposes, wherein building the topic model comprises using an unsupervised generative technique to determine the plurality of topics from the plurality of trip purposes based on probability;
derive one or more features from each of the plurality of trip records;
train a topic prediction model of an ensemble classifier, using the plurality of topics and the one or more features derived from each of the plurality of trip records, to output a topic based on an input trip record; and
train a purpose prediction model of the ensemble classifier, using the topic model and the plurality of trip purposes, to output a trip purpose based on an input topic,
wherein the purpose prediction model uses one or more words associated in the topic model with the input topic in determining the trip purpose,
wherein the trip purpose comprises the one or more words; and
wherein the trip purpose output by the purpose prediction model is recommended to a user via a user interface of the application running on the remote device.

14. The non-transitory computer-readable medium of claim 13, wherein the instructions, when executed by the one or more processors, further cause the computing system to:
receive supplementary data associated with the user; and
derive one or more supplementary features from the supplementary data, wherein each of the one or more supplementary data features is used in training the topic prediction model and the purpose prediction model.

15. The non-transitory computer-readable medium of claim 14, wherein:
the travel data is associated with the user; and
the ensemble classifier is specific to the user.

16. The non-transitory computer-readable medium of claim 13, wherein the instructions, when executed by the one or more processors, further cause the computing system to:
receive user feedback from the application running on the remote device; and
train the topic prediction model and the purpose prediction model based on the user feedback.

17. The non-transitory computer-readable medium of claim 13, wherein: each trip record of the plurality of trip records comprises at least a start location, an end location, a trip mileage associated, and a time associated with a trip.

18. The non-transitory computer-readable medium of claim 13, wherein the remote device is a smartphone.

* * * * *